June 23, 1964   W. I. BERKS ETAL   3,138,001
DEVICE TO ELIMINATE SHEAR SLIDE IN PRE-PACKAGED
LIQUID POWERPLANTS
Filed Oct. 11, 1962
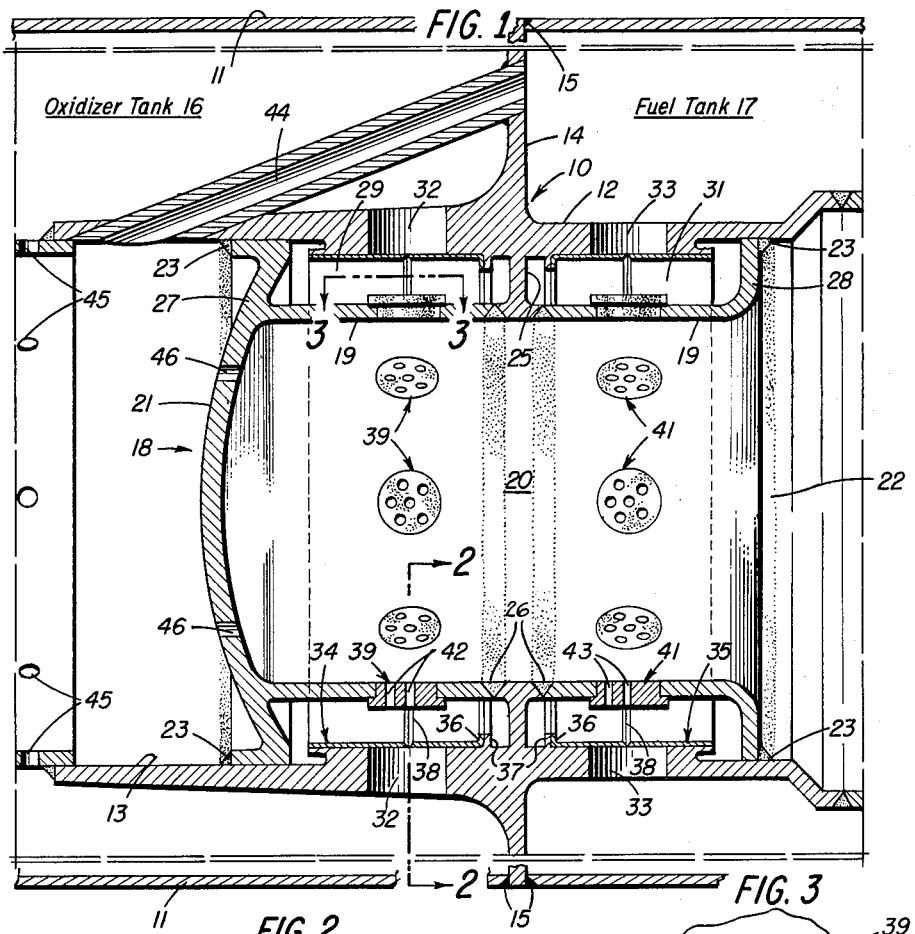
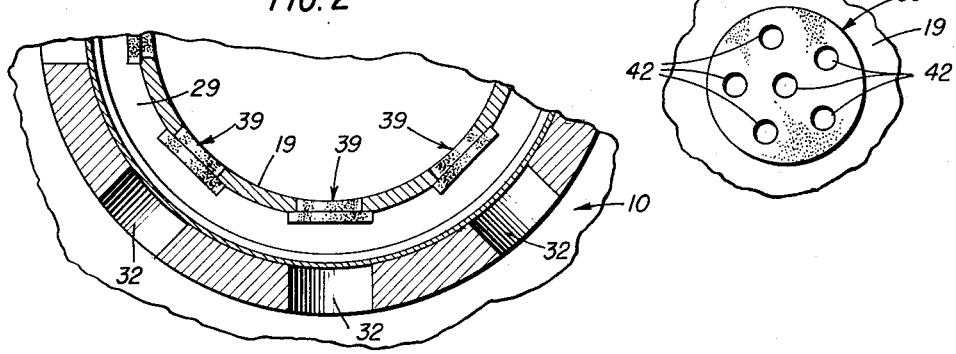
INVENTORS
WILLIAM I. BERKS
VICTOR BRAJER
BY Claude Funkhouser
ATTORNEY

United States Patent Office 3,138,001
Patented June 23, 1964

3,138,001
DEVICE TO ELIMINATE SHEAR SLIDE IN PRE-PACKAGED LIQUID POWERPLANTS
William I. Berks, Cedar Grove, and Victor Brajer, Wallington, N.J., assignors, by mesne assignments, to the United States of America as represented by the Secretary of the Navy
Filed Oct. 11, 1962, Ser. No. 230,017
3 Claims. (Cl. 60—39.48)

This invention relates to a device suitable for use with pre-packaged liquid powerplants and more particularly to a new and improved fluid control device for maintaining the liquid propellants sealed within the propellant tanks until the tanks attain a predetermined pressure.

More specifically, the invention is constructed and arranged to eliminate the shear slide in missile thrust units such, for example, as the type disclosed in the copending application of DeLacy F. Ferris for a Shock Absorber—Conical, Serial Number 206,560, filed June 28, 1962. Furthermore, this device eliminates the problems of ignition shock and drop-testing in existing thrust units which utilize shear slides. In addition, the invention provides considerable savings in fabrication costs and considerable weight reduction compared to the devices now in service.

In accordance with the present invention the conventional shear slide and shear cups are replaced by a pair of frangible members or burst bands, one for each liquid propellant tank. The members or bands seal the oxidizer and fuel tanks and prevent flow and mixing of the propellant in the combustion chamber of the unit until the unit is pressurized by a gas generator or the like, whereupon the bands will burst or rupture when the propellant tanks attain a predetermined or bursting pressure. Upon bursting of the bands the propellants flow from each of the aforesaid tanks through a plurality of cooperating outlet holes formed in the central header and into collecting annuluses provided between the header and casing enclosing the combustion chamber; from the annuluses the propellants flow through a plurality of metering orifices formed in mutually spaced plugs, disposed about the casing, in communication with their respective annuluses and into the combustion chamber.

It is an object of the present invention to provide a new and improved flow control device operated in response to a predetermined pressure.

Another object of the invention is to provide a new and improved fluid flow control device wherein fluid communication between the propellant tanks and the combustion chamber is prevented until the tanks are in a pressurized condition.

Still another object of the invention is to provide a novel thrust unit which is devoid of shear slides and shear cups and which operates only when the propellant tanks attain a predetermined pressure.

A still further object of the invention is to provide a novel thrust unit having frangible means for initiating the flow of liquid propellants into a combustion chamber as the frangible means are ruptured in response to a predetermined pressure.

An additional object of the invention is to provide a thrust unit having pressure responsive rupturable sealing devices for unsealing the propellant outlet opening only during a normal missile firing operation and in response to a predetermined pressure applied thereto.

Other objects, advantages and novel features of the invention will become apparent from the following detailed description of the invention when considered in conjunction with the accompanying drawings wherein:

FIG. 1 is a fragmentary longitudinal sectional view of a device constructed in accordance with the present invention;

FIG. 2 is a fragmentary cross-sectional view taken substantially along the line 2—2 of FIG. 1;

FIG. 3 is a detail sectional view taken substantially along the line 3—3 of FIG. 1, illustrating one of the metering plugs and the metering orifices therein; and FIG. 4 is a fragmentary detail perspective view of one of the frangible members or burst bands of FIG. 1.

Referring now to the drawing and more particularly to FIG. 1 thereof, the numeral 10 generally indicates a header structure comprising an outer cylindrical wall 11 and an inner cylindrical wall 12, the inner wall 12 forming a centrally disposed bore 13. The wall 12 is provided with a web or partition 14 secured to the outer wall 11, in any suitable manner such, for example, as by brasing or welding the parts together, as at 15, to provide an oxidizer tank 16 and a fuel tank 17.

A combustion unit or device generally designated by the numeral 18 is disposed within the bore 13 and comprises a cylindrical wall 19 enclosing a combustion chamber 20. Chamber 20 may be lined by any suitable material, such as a boride, for instance, to inhibit corrosion and erosion and to ensure integrity of the chamber during a combustion operation. The wall 19 is disposed in spaced relation with respect to the wall 12 and is provided with a wall 21 at one end thereof and open at the other end thereof, as at 22, the unit being sealed and secured to the wall 12, as at 23 such, for example, as by a brasing or welding operation. The wall 12 has formed thereon a web or partition 25 in engagement with and secured to the wall 19, as at 26 and by reason of the web 25 and flanged portions 27 and 28 on the wall 19 a pair of annuluses 29 and 31 are provided between walls 12 and 19.

The wall 12 is provided with a plurality of mutually spaced outlet openings 32 in communication with the oxidizer tank 16 and the annulus 29. The wall 12 is provided with additional outlet openings 33 similar to outlet openings 32, openings 33 being in communication with the fuel tank 17 and the annulus 31. The openings 32 and 33 are normally sealed by frangible members or burst bands 34 and 35, which bands are similar in construction and may consist of thin annular members composed of any frangible material suitable for the purpose and having an inturned flange 36 on one edge thereof in engagement with a complementary flange 37 formed on the wall 12. The bands 34 and 35 are each provided with centrally disposed weakened portions 38 extending entirely around the surfaces thereof.

The wall 19 of the combustion unit 18 is provided with a plurality of plugs or metering devices 39 and 41, plug 39 being in communication with annulus or chamber 29 and combustion chamber 20 by reason of a plurality of metering orifices 42 and in registration with outlet port 32 of oxidizer tank 16. The plugs 41 are in communication with annulus or chamber 31 and the combustion chamber 20 by reason of a plurality of metering orifices 43 and in registration with outlet port 33 in fuel tank 17.

It will be understood that the burst bands 34 and 35 are constructed and arranged to burst or rupture at a predetermined pressure and thus to facilitate bursting of the bands the oxidizer and fuel tanks must be in a pressurized condition, which condition only exists during an actual and normal missile run or firing operation. These tanks may be pressurized in any suitable manner such, for example, as by a conventional gas generator (not shown), the pressure entering the fuel tank 17 by way of conduit 44 and the oxidizer or tank by way of a plurality of openings 45. Furthermore, to facilitate a proper combustion mixture within the combustion chamber 20, jet mix orifices 46 are provided in the end wall 21 of the combustion unit 18.

During an actual missile firing operation, the burst bands will burst when the pressure in the tanks is within a fraction of the operating tank pressure. For example, for an operating tank pressure of 1200 p.s.i., the burst bands should burst at 300–400 p.s.i. It is possible that the burst bands may not rupture uniformly around their circumference; however, the tank outlet ports 32 and 33 will be sufficiently large in number so that if only a portion thereof are uncovered there will be negligible flow resistance resulting therefrom.

In operation it will be apparent that when the tanks 16 and 17 attain a predetermined pressure and burst the bands 34 and 35, the propellants in tanks 16 and 17 are released and flow through their respective outlet ports 32 and 33 and into their respective collecting annuluses 29 and 31. From annulus 29 the flow is through metering orifices 42 into the combustion chamber 20 and from annulus 31 flow is through metering orifices 43 into the combustion chamber. Upon entering the combustion chamber the oxidizer and fuel burn on contact and since the propellants are pressurized propulsion of the missile takes place.

By the aforesaid arrangement fabrication of this device is greatly simplified, compared to present shear slide systems and no O-rings are required for sealing the device during a firing operation, as is customary in prior art devices. This permits furnace brazing of the entire header assembly, if so desired. Furthermore, many of the close tolerance machining operations inherent in shear slide design are not required in the fabrication of this device and the all-aluminum construction of this device provides considerable weight reduction over such devices.

Obviously, many modifications and variations of the present invention are possible in the light of the above teachings. It is, therefore, to be understood that within the scope of the appended claims the invention may be practiced otherwise than as specifically described.

What is claimed is:
1. In a missile thrust unit and propellant control device of the class described,
   a casing having mutually spaced inner and outer walls,
   a first annular partition for interconnecting said inner and outer walls,
   a plurality of normally depressurized tanks disposed on either side of said first partition between said inner and outer walls,
   a combustion chamber disposed within and mutually spaced from said inner wall,
   a flange disposed on each end of said combustion chamber which flange is secured in sealing relationship to said inner wall for supporting said combustion chamber within said casing,
   a second annular partition disposed between the flanges on either end of said combustion chamber for securing in a sealing relationship said combustion chamber and said inner wall thereby providing an annular fluid collecting chamber on either side of said second annular partition,
   annular frangible means having circumferentially disposed weakened portions carried by said inner wall for sealing said tanks from said fluid collecting chambers when said tanks are depressurized and for being ruptured at said weakened portions to unseal said tanks when said tanks are in a pressurized condition to allow fluid to flow into said fluid collecting chambers,
   means in communication with said tanks for establishing an external pressure connection thereto, and
   means including a plurality of orifices disposed in said combustion chamber for metering fluid flow from said annular fluid collecting chambers into said combustion chamber.

2. In a missile thrust unit and propellant control device of the class described,
   a casing having mutually spaced inner and outer walls,
   a first annular partition for interconnecting said inner and outer walls,
   a plurality of normally depressurized tanks disposed between said inner and outer walls and on either side of said first partition,
   a combustion chamber disposed within and mutually spaced from said inner wall,
   flanges disposed on each end of said combustion chamber for supporting said combustion chamber in spaced and sealed relationship with said inner wall,
   a second annular partition disposed along said combustion chamber for additional support of said combustion chamber in spaced and sealed relationship with said inner wall thereby to provide an annular fluid collecting chamber on each side of said second annular partition,
   fluid outlet means disposed on said inner wall for establishing fluid communication between said tanks and said annular fluid collecting chambers,
   annular frangible means having circumferentially disposed weakened portions intersecting said outlet means and carried by said inner wall for sealing said outlet means and for rupturing at said weakened portions to unseal said outlet means when said tanks are in a pressurized condition to allow the pressurized fluid to flow therethrough and into said fluid collecting chambers,
   plug means carried by said combustion chamber and provided with a plurality of orifices in communication with said annular fluid collecting chambers and said combustion chamber for metering fluid flow from said collecting chambers into said combustion chamber, and
   means including a plurality of orifices in communication with said tanks for establishing an external pressure connection thereto.

3. In a missile thrust unit of the class described,
   a casing having mutually spaced inner and outer walls,
   a combustion chamber disposed within and mutually spaced from said inner wall,
   an annular partition interconnecting said inner wall and said outer wall and said inner wall and said combustion chamber,
   a normally depressurized fluid propellant tank disposed on each side of said partition between said inner and outer walls,
   a flange disposed on each end of said combustion chamber for supporting said combustion chamber in spaced and sealed relationship with said inner wall thereby providing an annular fluid collecting chamber on each side of said annular partition between said inner wall and said combustion chamber,
   the fluid propellant tank on the first side of said partition being in fluid communication with the annular fluid collecting chamber on said first side of said partition through a first plurality of outlet ports disposed in said inner wall,
   the fluid propellant tank on the second side of said partition being in fluid communication with the annular fluid collecting chamber on said second side of said partition through a second plurality of outlet ports disposed in said inner wall,
   an annular frangible band having a circumferentially disposed weakened portion disposed in each fluid collecting chamber for sealing the plurality of outlet ports therein and rupturable to unseal said outlet ports when the respective propellant tanks are pressurized, plug means provided with a plurality of orifices disposed in the wall of said combustion chamber for metering fluid flow from said fluid collecting chambers into said combustion chamber, and means including a plurality of orifices in communication with said propellant tanks for establishing an external pressure connection thereto.

References Cited in the file of this patent
UNITED STATES PATENTS

| | | |
|---|---|---|
| 2,671,312 | Roy | Mar. 9, 1954 |
| 2,868,127 | Fox | Jan. 13, 1959 |
| 2,972,225 | Cumming et al. | Feb. 21, 1961 |
| 3,094,837 | Sherman et al. | June 25, 1963 |